United States Patent [19]

Levacher et al.

[11] Patent Number: 4,943,714
[45] Date of Patent: Jul. 24, 1990

[54] METHOD OF CONTINUOUS MEASUREMENT OF DAMPING IN AN ELONGATED LIGHT WAVE CONDUCTOR-SENSOR HAVING ONLY ONE ACCESSIBLE END

[75] Inventors: Friedrich K. Levacher, Brauweiler; Helmut Federmann; Georg Noack, both of Bergisch Gladbach; Anton Kraus, Overath-Steinenbrück, all of Fed. Rep. of Germany

[73] Assignee: Felten & Guilleaume Energietechnik AG, Cologne, Fed. Rep. of Germany

[21] Appl. No.: 309,802

[22] Filed: Feb. 10, 1989

[30] Foreign Application Priority Data

Feb. 11, 1988 [DE] Fed. Rep. of Germany ....... 3804135

[51] Int. Cl.⁵ ................................................ H01J 5/16
[52] U.S. Cl. ............................ 250/227.16; 250/227.17
[58] Field of Search .......................... 250/227, 225; 350/96.10, 96.15

[56] References Cited

U.S. PATENT DOCUMENTS

| | | | |
|---|---|---|---|
| 4,492,860 | 1/1985 | Brogardh et al. | 250/227 |
| 4,644,154 | 2/1987 | Brogardh et al. | 250/227 |
| 4,703,175 | 10/1987 | Salour et al. | 250/227 |
| 4,750,139 | 6/1988 | Dils | 250/227 |
| 4,757,194 | 7/1988 | Simms | 250/227 |

Primary Examiner—David C. Nelms
Attorney, Agent, or Firm—Michael J. Striker

[57] ABSTRACT

To enable a continuous measurement of damping of a light beam in light wave conductor (LWC)-sensor which is accessible at one end only, a measuring light beam emitted by a transmitter is guided through a light wave conductor into a beam divider in which a measuring partial light beam is guided in the same direction as the transmitted beam to a measuring LWC-sensor. At the free end of the sensor the measuring partial light beam is totally reflected to propagate in reverse direction back against the beam divider where it is deflected by 90° and guided into a light receiving and measuring unit. The other partial light beam is employed either for the temperature compensation or for the compensation of the power output of the light transmitter or of sensitivity of the light receiver.

1 Claim, 2 Drawing Sheets

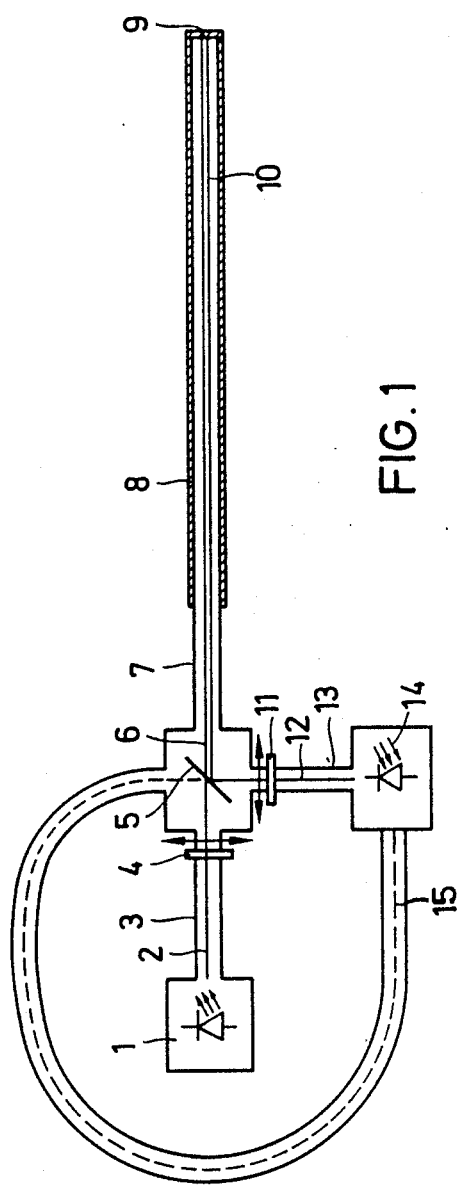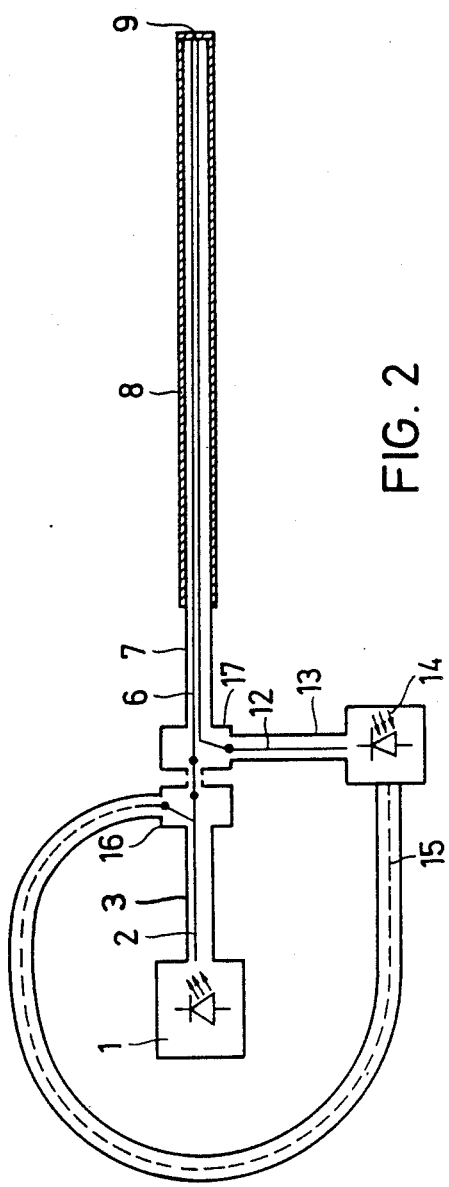

METHOD OF CONTINUOUS MEASUREMENT OF DAMPING IN AN ELONGATED LIGHT WAVE CONDUCTOR-SENSOR HAVING ONLY ONE ACCESSIBLE END

BACKGROUND OF THE INVENTION

The invention relates in general to a method for a continuous measurement of damping of a light beam in an elongated light wave conductor (LWC)-sensor at which only one of its two ends is accessible.

In LWC-sensors for measuring mechanical stresses such as pull tension, bending stresses and torque, the change in the damping of the light passing through the sensor is usually employed as a criterium for the detection of the change of the stress to be detected. According to prior art damping measurements the beginning and the end of the sensors are provided respectively with an optical transmitter and an optical receiver in order to enable a continuous measurement.

For example, in the German Patent DE-PS No. 3,505,234 LWC-pull tension sensor is described in which the light wave conductor (LWC) is embedded in a pull tension resistant wire of fiber reinforced resinous material whereby a non-homogenous intermediate layer is provided between the wire material and the light wave conductor. Presently, the preferred embodiment of the intermediate layer is in the form of a coil of a steel wire wound around the light wave conductor. This known LWC-pull tension sensor is provided at its both ends with connectors for a light passage testing apparatus or a light damping measurement apparatus both including a light transmitter and a light receiver. Since during the elongation of the pull tensioned wire its cross-section decreases, there occur transverse force components which are transferred with an amplified effect against the light wave conductor and produce therein microbendings. The microbendings cause an increase in the light damping which is measured and employed as a measure for the elongation. In this manner, such LWC-tension sensors are fixed in the load direction for example to a part of a prestressed concrete bridge to monitor it for ruptures. However, this known measuring method is unsuitable when only one of the ends of the LWC-sensor is accessible. In this case the damping measurement can be carried out by means of a commercially available back scatter measuring apparatus which is attached to the accessible end of the sensor only and which additionally enables the location of a defect. However, contemporary back scatter concept is based on the transmission of pulses and is unsuitable for a continuous damping measurement and for a continuous monitoring by means of LWC-sensors.

SUMMARY OF THE INVENTION

It is therefore a general object of the present invention to overcome the aforementioned disadvantages.

More particularly, it is an object of the invention to provide an improved method of a continuous light damping measurement in LWC-sensors at which only one end is accessible.

Another object of this invention is to increase the sensitivity of the measurement.

In keeping with these objects and others which will become apparent hereafter, one feature of the invention resides in the steps of guiding a measuring light beam emitted from a light transmitter through a light wave conductor to a beam divider from which a split first partial stream is guided without deviation to the accessible end of the LWC-sensor and is reflected by a mirror surface at the non-accessible end to propagate in reverse direction back against the beam divider where it is deflected and guided into a measuring light receiving unit.

In a further elaboration of this invention, the second split or partial light beam is guided directly into the measuring and light receiving unit to serve for compensation of fluctuations or irregularities which may occur in the performance of the light transmitter or in the sensitivity of the light receiver. The beam divider can be designed in the form of a semi-transparent mirror inclined at an angle of 45°, or in the form of Y-divider. To prevent a direct radiation from the light transmitter to the light receiver when multi-mode light wave conductors are used, one polarizer is arranged at the input of the beam divider and another polarizer oriented at 90° to the first one, is arranged at the output of the beam divider leading to the measuring and light receiving unit.

In addition, in order to provide a temperature compensation, the transmitter transmits a reference light beam parallel to the measuring light beam. The reference light beam is processed in the same fashion as the measuring light beam and is reflected in a reference light wave conductor-sensor which is loosely arranged in close proximity to the measuring LWC-sensor which is fixed to a structural part whose tension is to be monitored. The reflected and deflected partial light beams of the measuring and reference main light beams are alternately fed into the light measuring and receiving unit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 shows schematically an arrangement of a LWC-sensor for carrying out the measuring method of this invention by using a semi-transparent mirror as the measuring beam divider and multi-mode light wave conductors for the sensor and the light conduits;

FIG. 2 shows an arrangement similar to that of FIG. 1 except the beam divider is in the form of two consecutively arranged Y-shaped light wave conductors.

DESCRIPTION OF THE PREFERRED EMBODIMENTS

Figure 3:
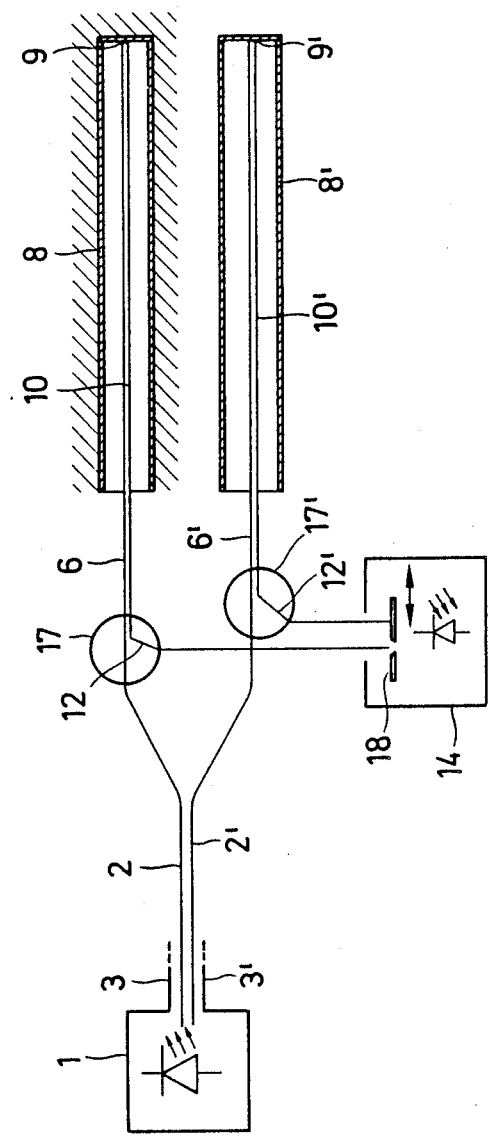
FIG. 3 illustrates schematically an arrangement of a measuring LWC-sensor and a reference LWC-sensor for temperature compensation.

As shown in FIG. 1, a beam 2 of substantially parallel light rays emitted by a commercially available optical transmitter 1 reaches through a light wave conductor 3 serving as a guide conduit and through a polarizer 4 semitransparent mirror 5 which is inclined at 45° to the direction of propagation of the light beam. The semi-transparent mirror divides the light beam into a measuring partial beam 6 which is guided by a light wave conductor or LWC 7 into one end of the elongated LWC-sensor 8. The other end face of the LWC-sensor is polished and provided with a reflective coating or with a glued mirror 9 so that a total reflection of the measuring partial beam takes place.

The reflected partial light beam 10 propagates in reverse direction through the LWC-sensor 8 and through the connecting light wave conductor against the rear side of the semi-transparent mirror 5 where the measuring partial light beam carrying information about damping is deflected by 90° and passed through another polarizer 11 whose polarization plane is turned by 90° relative to the polarizer 4 and then is guided by light wave conductor 13 into a light receiving and measuring unit 14.

To detect the change of a measuring parameter such as for example of a mechanical stress, temperature or radiation dose of an object being monitored, the transmitter 1 and receiver unit 14 are offset into the illustrated positions. A LWC-sensor 8 is attached to an object to be monitored and changes in the object cause corresponding changes in the damping quality of the sensor which are detected in the two passes of the measuring partial light beam and measured by the measuring and light receiving unit 14. In contrast to prior art practice where the measuring receiver is arranged at the opposite end of the LWC-sensor, the method of this invention doubles the effect of the damping change on the measuring light beam and consequently the sensitivity of measurement is increased.

The other partial light beam 15 deflected at the front side of the inclined semi-transparent mirror 5 is directly guided into the measuring and light receiving unit 14 where it is compared in a conventional comparator with a reference value to serve for the compensation of changes in the transmitter output or in the receiver sensitivity which may occur during the operation.

The two polarization filters 4 and 11 which are mutually oriented at 90° serve for the protection against an immediate transmission of light from the transmitter 1 to the receiver 14. The polarizers 4 and 11 are necessary in the case when multi-mode light wave conductors or the guiding conduits and for the LWC-sensor are employed. However, if polarization preserving monomode light wave conductors are used, then two polarizers must be dispensed with and transmitter is directly coupled with the receiver.

As shown in FIG. 2, instead of the semi-transparent mirror 5 it is possible to use as a light beam divider two Y-shaped light wave conductors 16 and 17 arranged one after the other in the transmission path of the main light beam 2. The aforementioned polarizers are eliminated. The beam of substantially parallel light rays 2 emitted from the light transmitter 1 is guided through the LWC-conductor 3 to the first Y-divider 16 where the second partial light beam is reflected and directly guided into the measuring and light receiving unit 14 where as mentioned before, serves for the compensation of operational fluctuations. The measuring partial beam is guided into the second Y-divider 17 and through the LWC 7 is applied to the LWC-sensor 8 and as mentioned before reflected at the opposite end by the mirror 9. The reflected partial light beam 10 propagates in reverse direction to the Y-divider 17 where it is deflected and guided via the conduit 13 into the light receiver unit 14.

FIG. 3 illustrates schematically a device for measuring a reference signal which serves for the temperature compensation in long time measurements where the temperature dependency of damping in the LWC-sensors must be taken into account.

For this purpose, a light source such as a light emitting diode or a laser diode having a broad light emitting surface is connected with two light wave conductors 3 and 3' for guiding a measuring light beam 2 and an equal reference light beam 2' into assigned Y-dividers 17 and 17'. The Y-divider 17 is coupled in the aforedescribed manner with the measuring LWC-sensor 8 which is fixed to an object to be monitored. The reference light beam 2' passes through the other light beam divider 17' and the reference partial light beam 6' is guided into a reference LWC-sensor 8' which extends in close proximity to the measuring sensor 8 but is not connected to the measured object. Both sensors 8 and 8' are provided at their free ends with reflecting mirror surfaces 9 and 9' to reverse the forward directions of partial light beams 6 and 6' and return the same as light beams 10, 10' back into the Y-dividers 17, 17' where they are deflected in branch conductors 12 and 12' and guided into an inlet opening of the measuring and light receiving unit 14. A selection switch in the form of a shiftable diaphragm 18 is arranged at the inlet opening. The shiftable diaphragm is operated to align its aperture with one or the other deflected measuring or reference partial light beam such as to pass the same alternately on a broad light receiving surface of a photodiode.

In this manner the selector switch at each damping measurement applies at first reference partial light beam to the photodiode and thereafter the measuring partial light beam to the photodiode. A damping value determined from the reference partial light beam serves as a standard value for the damping measured from the measuring partial light beam. Inasmuch as the reference LWC-sensor 8' is not mechanically fixed to the object being monitored but is arranged in close proximity to the measuring LWC-sensor 8, it is made possible to compensate differences due to the different temperature behavior of the fixed measuring sensor. In the same manner it is also possible to compensate for changes in the light output of the light transmitter and in the sensitivity of the light receiver which may occur during long time measurements.

While the invention has been illustrated and described as embodied in specific examples of the arrangement for the continuous damping measurements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of continuous measurement of damping of a light beam in a light wave conductor (LWC)-sensor, comprising the steps of continuously emitting from a light transmitter a measuring light beam and guiding the same in a first direction through a beam divider in which it is split into two partial light beams; guiding a first partial light beam in the first direction through an elongated LWC-sensor whose damping properties is to be measured; reflecting at the free end of said LWC-sensor said first partial light beam by 180° to propagate in a reverse second direction against said beam divider;

deflecting said first partial light beam at said beam divider by 90° and guiding the same in the deflected third direction into a light receiving and evaluating unit; emitting from said light transmitter a reference light beam which is equal to said measuring light beam; guiding said measuring light beam via a light wave conductor through a first Y-beam divider; guiding said first partial light beam via a light wave conductor from said first Y-beam divider into said LWC-sensor which is fixed to a structural part to be monitored; guiding via a light wave conductor said deflected portion of said first partial light beam into an input opening of said light receiving and evaluating unit; and, in the same manner, guiding said reference light beam through a light wave conductor which corresponds in thermal properties to the first mentioned light wave conductor, into a second Y-beam divider, guiding a reference partial light beam from said second Y-beam divider into a reference LWC-sensor which is equal to said fixed LWC-sensor and being arranged in close proximity thereto; and guiding deflected portions of said reference partial light beam against a shiftable diaphragm arranged in said input opening of the light receiving and evaluating unit; and operating said shiftable diaphragm to pass said reference partial light beam into said unit before the passage of said measuring partial light beam into said measuring unit to act as a measuring standard.

* * * * *